United States Patent Office 2,694,066
Patented Nov. 9, 1954

2,694,066

LIPOIC ACID AMIDES OF THIAMINE COMPOUNDS

Lester J. Reed, Austin, Tex., assignor to Research Corporation, New York, N. Y., a corporation of New York No Drawing. Application May 21, 1952,
Serial No. 289,189

7 Claims. (Cl. 260—256.5)

This invention relates to new biologically active substances and to methods of preparing them.

It has been found that amide condensation products of α-lipoic acid

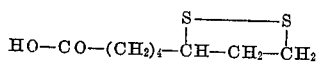

and its sulfoxide, β-lipoic acid, with the amino group of pyrimethyl compounds such as 2-methyl-5-alkoxymethyl-6-aminopyrimidines, thiamine, and the phosphoric acid and pyrophosphoric acid esters of thiamine are active in promoting the growth of microorganisms.

α-Lipoic and β-lipoic acids have been described in the literature under these names and the acids are well recognized.

See, for example: Reed et al., J. Biol. Chem., 192, 851 (1951); Reed et al., ibid., 192, 859 (1951); Gunsalus et al., ibid., 194, 859 (1952); Hornberger et al., J. Am. Chem. Soc., 74, 2382 (1952); Reed et al., ibid., 75, 1267 (1953); Reed et al., ibid., 75, 1271 (1953); Hornberger et al., ibid., 75, 1273 (1953).

The term "pyrimethyl" designates pyrimidine compounds having a group attached to the 5-position of the pyrimidine ring through a —$CH_2$-group. See U. S. Patent No. 2,350,265 to R. R. Williams et al.

Of particular interest is the α-lipoic acid amide of thiamin of the following structural formula

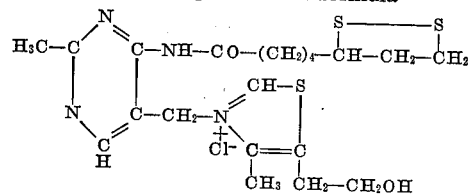

This new compound has been named lipothiamide. It has an $R_f$ value of 0.52 when chromatographed with 2,6-lutidine-water (65:35).

The new compound can be distinguished biologically from a mixture of thiamin and lipoic acid by means of a mutant of *Escherichia coli* which in a minimal medium does not respond to either thiamin or α-lipoic acid or to a mixture of these substances but does respond to the new compound.

The new compounds of the invention may be made by the typical methods for combining carboxylic acids and amines to form amides and also by biochemical condensation.

The following examples are illustrative of the methods and compounds of the invention:

EXAMPLE 1

*Lipothiamide (4'-N-lipoylthiamine)*

A solution of 3.37 mg. of thiamin hydrochloride in 0.2 cc. of water is treated with 1.16 mg. (1 equivalent) of silver oxide. The silver chloride formed is removed by centrifugation and the aqueous solution is evaporated in vacuo over calcium chloride. To the amorphous residue is added 444γ of 50 per cent pure α-lipoic acid. The mixture is dissolved in 0.2 cc. methanol and the solvent then removed in vacuo. The residue is heated at 130° for 4 hours in vacuo (1 mm.). The product produces maximum growth of the mutant at a level of $7.8 \times 10^{-5}$γ per cc. of growth medium.

EXAMPLE 2

*Lipothiamide (4'-N-lipoylthiamine)*

To 1 mg. of the 50% α-lipoic acid concentrate in a small tube is added 0.02 cc. of oxalyl chloride. The tube is sealed and heated at 60° to 70° for 90 minutes. At the end of this time the tube is opened and unreacted oxalyl chloride removed in vacuo. The residue, containing the acid chloride of α-lipoic acid is dissolved in a few drops of pyridine and is added to a solution of thiamin, prepared from 1.68 mg. of thiamin hydrochloride as described above, in a few drops of formamide. The reaction mixture is allowed to stand at room temperature for three days. At the end of this time most of the solvent is removed in vacuo. The product produces maximum growth of the mutant at a level of $2.5 \times 10^{-6}$γ per cc. of growth medium.

EXAMPLE 3

*Lipothiamide (4'-N-lipoylthiamine)*

2 mg. (dry weight) of a washed culture of *Streptococcus lactis* are suspended in water and incubated with 10γ of thiamin and 10γ of α-lipoic acid for one hour at 30° C. After incubation the cells are removed by centrifugation. The incubation medium produces maximum growth of the *E. coli* mutant referred to above at a level of 0.001γ per cc. of culture medium based on the amount of α-lipoic acid used. In the absence of either α-lipoic acid or thiamin the incubation medium does not support growth of the mutant.

Similar results can be obtained when wild type *E. coli* or *S. faecalis* are substituted for the *S. lactis* in this example.

EXAMPLE 4

*2-methyl-5-ethoxymethyl-6-lipoylaminopyrimidine*

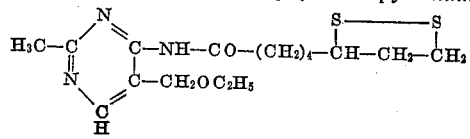

is prepared as follows: 1 mg. α-lipoic acid (50% pure) and 0.02 cc. oxalyl chloride are heated in a sealed tube at 60° for 90 minutes. The tube is opened, excess oxalyl chloride removed in vacuo, the residue dissolved in 0.1 cc. pyridine and added to 1.67 mg. of the pyrimidine. The solution is allowed to stand 3 days at room temperature and the pyridine removed in vacuo.

The reaction mixture produces maximum growth of the mutant at a level of $5 \times 10^{-5}$γ per cc. of growth medium and the active substance has an $R_f$ value of 0.70 (2,6-lutidine-water).

EXAMPLE 5

*Lipothiamide phosphate (4'-N-lipoylthiamine phosphate)*

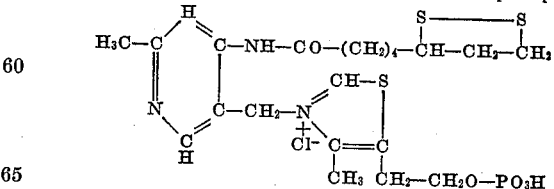

is made as follows: 1 mg. of α-lipoic acid (50% pure) is converted to the acid chloride as described above. A solution of the latter in a few drops of pyridine is added to a solution of 1.9 mg. of thiamin monophosphate in a few drops of formamide. The reaction mixture is allowed to stand at room temperature for 3 days at which time it is assayed with the *E. coli* mutant. The reaction mixture produces maximum growth of the mutant at a level of $1 \times 10^{-5}$γ per cc. of growth medium. The active substance has an $R_f$ of 0.25 (2,6-lutidine-water).

EXAMPLE 6

*Lipothiamide pyrophosphate (4'-N-lipoylthiamine pyrophosphate*

The pyrophosphate of lipothiamide is made from

α-lipoic acid and thiamin pyrophosphate by the method of Example 5.

The reaction mixture produces maximum growth of the *E. coli* mutant at a level of $2.5 \times 10^{-6} \gamma$ per cc. of growth medium. The active substance has an $R_f$ of 0.10 (2,6-lutidine-water).

EXAMPLE 7

*Lipothiamide sulfoxide (4'-N-lipoylthiamine sulfoxide)*

Corresponding sulfoxides may be obtained by substituting β-lipoic acid for α-lipoic acid in the foregoing example. For example, lipothiamide sulfoxide may be made as follows: 1.16 mg. of thiamin hydrochloride is treated with one equivalent of silver oxide as described previously. To a solution of the thiamin obtained, in a few drops of formamide, is added a solution in pyridine of the acid chloride of β-lipoic acid (the sulfoxide of α-lipoic acid) prepared from 500γ of a concentrate of β-lipoic acid (100,000 units/mg.). After standing for three days at room temperature the reaction mixture produces maximum growth of the *E. coli* mutant at a level of $3 \times 10^{-5} \gamma$ per cc. of growth medium. The active substance possesses an $R_f$ value of 0.50 with 2,6-lutidine-water as the solvent system.

I claim:
1. Biologically active substances of the group consisting of α- and β-lipoic acid amides of pyrimethyl compounds of the group consisting of 2-methyl-5-alkoxymethyl-6-aminopyrimidines, thiamine, thiamine phosphate and thiamine pyrophosphate.
2. 4'-N-lipoylthiamine.
3. 4'-N-lipoylthiamine phosphate.
4. 4'-N-lipoylthiamine pyrophosphate.
5. 4'-N-lipoylthiamine sulfoxide.
6. 2 - methyl - 5 - ethoxymethyl - 6 - lipoylaminopyrimidine.
7. The method of making biologically active substances which comprises condensing a carboxylic acid of the group consisting of α- and β-lipoic acids with a pyrimethyl compound of the group consisting of 2-methyl-5-alkoxymethyl-6-aminopyrimidines, thiamine, thiamine phosphate and thiamine pyrophosphate.

No references cited.